(12) United States Patent
Ito-Lardeau et al.

(10) Patent No.: US 10,767,505 B2
(45) Date of Patent: Sep. 8, 2020

(54) TURBOMACHINE SHAFT

(71) Applicant: SAFRAN AIRCRAFT ENGINES, Paris (FR)

(72) Inventors: Youki Olivier Ito-Lardeau, Moissy-Cramayel (FR); Pierrick Raphael Americo Bauduin, Moissy-Cramayel (FR); Stephane Pierre Guillaume Blanchard, Moissy-Cramayel (FR); Bertrand Guillaume Robin Pellaton, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 89 days.

(21) Appl. No.: 15/320,303

(22) PCT Filed: Aug. 28, 2015

(86) PCT No.: PCT/FR2015/052284
§ 371 (c)(1),
(2) Date: Dec. 19, 2016

(87) PCT Pub. No.: WO2016/034796
PCT Pub. Date: Mar. 10, 2016

(65) Prior Publication Data
US 2017/0254213 A1    Sep. 7, 2017

(30) Foreign Application Priority Data

Sep. 5, 2014 (FR) ..................... 14 58315

(51) Int. Cl.
*F01D 17/02* (2006.01)
*F01D 5/02* (2006.01)
(Continued)

(52) U.S. Cl.
CPC ............. *F01D 17/02* (2013.01); *F01D 5/026* (2013.01); *F02C 7/36* (2013.01); *F16C 3/023* (2013.01);
(Continued)

(58) Field of Classification Search
CPC . F01D 17/02; F01D 5/026; F16D 1/02; F16D 1/10; F16D 2001/103; F16C 3/023;
(Continued)

(56) References Cited

U.S. PATENT DOCUMENTS 1,734,268 A * 11/1929 Moorhouse ............ B21D 53/00
                                                                  464/183 X
2,796,600 A *  6/1957 Church .................. G01M 1/22
                                                                  73/660
(Continued)

FOREIGN PATENT DOCUMENTS

DE    10 2012 016 679 A1    3/2013
EP         1813769 A1       8/2007
(Continued)

OTHER PUBLICATIONS

International Search Report with English Language Translation, dated Feb. 8, 2016, PCT Application No. PCT/FR2015/052284.
(Continued)

*Primary Examiner* — Greg Binda
(74) *Attorney, Agent, or Firm* — Womble Bond Dickinson (US) LLP

(57) ABSTRACT

A tubular shaft (8) of a turbomachine, including at the inner periphery of same, a bath (11), substantially perpendicular to splines (9), the bath (11) includes cavities (17) distributed over a circumference centred on an axis of rotation (LL) of the shaft (8).

16 Claims, 4 Drawing Sheets

(51) Int. Cl.
*F02C 7/36* (2006.01)
*F16C 3/02* (2006.01)
*F16D 1/02* (2006.01)
*F16D 1/10* (2006.01)

(52) U.S. Cl.
CPC ............... *F16D 1/02* (2013.01); *F16D 1/10* (2013.01); *F05D 2240/61* (2013.01); *F16D 2001/103* (2013.01); *Y10T 403/7026* (2015.01); *Y10T 464/20* (2015.01)

(58) Field of Classification Search
CPC .... F02C 7/36; Y10T 403/7026; Y10T 464/20; F05D 2240/61
USPC .................. 464/7, 183; 73/66; 415/122.1
See application file for complete search history.

(56) References Cited

U.S. PATENT DOCUMENTS

| | | | | |
|---|---|---|---|---|
| 3,656,318 | A | * | 4/1972 | Smith ................ F16D 3/227 |
| 3,889,771 | A | | 6/1975 | Kronogard |
| 4,639,194 | A | | 1/1987 | Bell, III et al. |
| 8,672,768 | B2 | * | 3/2014 | Colson ................ H02K 7/14 464/183 |
| 9,932,860 | B2 | * | 4/2018 | Stutz ................ F01D 25/18 |
| 2006/0191746 | A1 | | 8/2006 | Diosi et al. |
| 2007/0212226 | A1 | | 9/2007 | Guihard et al. |
| 2009/0031732 | A1 | | 2/2009 | Wilson, Jr. et al. |
| 2012/0202607 | A1 | | 8/2012 | Fujio |
| 2013/0325286 | A1 | | 12/2013 | Lacaille |

FOREIGN PATENT DOCUMENTS

| | | | | |
|---|---|---|---|---|
| FR | 2168938 | A1 | | 9/1973 |
| FR | 2952402 | A1 | | 5/2011 |
| FR | 2993311 | A1 | | 1/2014 |
| GB | 1357712 | A | | 6/1974 |
| GB | 2 117 487 | A | * | 10/1983 ............ 464/7 |
| GB | 2136531 | A | | 9/1984 |
| JP | S5020424 | | | 4/1975 |
| JP | 2002201901 | | | 7/2002 |
| JP | 2011112117 | | | 6/2011 |
| RU | 2474709 | C2 | | 2/2013 |
| WO | WO 01/07762 | A1 | * | 2/2001 |
| WO | WO 2010/092080 | A1 | | 8/2010 |

OTHER PUBLICATIONS

Office Action received for Russian Patent Application No. 2016149783, dated Mar. 4, 2019, 14 pages (6 pages of English Translation and 8 pages of Office Action).

"First office action," JP Application No. 2016-574108 (dated Jul. 2, 2019).

* cited by examiner

TURBOMACHINE SHAFT

FIELD OF THE INVENTION

The present invention relates to the field of turbine engines and more particularly to that of shafts transmitting power between the different rotors of a turbine engine.

PRIOR ART

A turbine engine generally comprises, when it is a bypass engine as illustrated diagrammatically in FIG. 1, from upstream to downstream in the direction of flow of the gases, a fan 1, one or more than one compressor stage, low pressure 2 then high pressure 3, a combustion chamber 4, one or more than one turbine stage, high pressure 5 then low pressure 6, and a gas exhaust pipe. Rotors, rotating about the main axis LL of the turbine engine and capable of being connected to one another by different transmission and gearing systems, correspond to these different elements.

In particular, the driving of the low pressure compressor 2 by the low pressure turbine 6 is effected by the connection between the shafts 7 and 8, which are connected to them respectively. A connection between these two shafts 7, 8 is therefore indispensable in order to transmit the torque from the low pressure turbine 6 to the low pressure compressor 2.

With reference to FIG. 2, in a known manner, splines 9, distributed at the periphery close to an end 10 of the shaft 8 of the low pressure turbine 6 that is inserted into the shaft 7 of the low pressure compressor 2, enable this torque to be transmitted.

Furthermore, the shaft 8 of the low pressure turbine generally has a hollow tubular shape close to this end 10. Also in a known manner, a trough 11 is made in the inner periphery of the shaft 8, in line with the splines 9, and its shape is optimised in order to minimise the mass of the shaft 8 while ensuring its mechanical strength as the torque is transmitted.

In this technology, the shaft 8 of the low pressure turbine also comprises a radially inner tubular part 12 at the end 10. The function of this inner tubular part 12 is, in particular, to close the trough 11 and with the shaft 8 it forms an annular cavity 13 at the trough 11.

This annular cavity 13 is generally sealed by ring seals 14 positioned at its ends, between the shaft 8 and the tubular part 12. This is because the end 10 of the shaft 8 bathes in a flow of air 15 coming from other parts of the turbine engine. This air is de-oiled but it nevertheless includes a small quantity of oil. This technology prevents the oil from accumulating through a centrifugal effect in the trough 11 and does not lead to fatigue in the structure of the shaft 8 through unbalance effects.

Although this is not usually the case, the design of a turbine engine must take into account the risk of oil being retained in the trough 11 if the impermeability of one of the seals 14 becomes insufficient. In this eventuality, the pocket of oil thus created is spread over the outer walls of the trough 11 under the effect of the centrifugal force and slides in the shaft 8 in rotation. It therefore does not rotate at the same speed as the shaft. FIG. 3 illustrates, for example, a maximum unbalance effect, at 180°, where an oil pocket 16 collects on one side of the annular cavity 13, on the lower side in the drawing, leaving the diametrically opposite part of the annular cavity 13 empty.

Experience shows that the vibration frequencies produced by such an oil pocket 16 on the structures appear at approximately 90% of the rotation speed of the shaft 8. These vibrations are asynchronous and cannot be detected by sensors. For this reason, the shaft 8 of the low pressure turbine 6 is the seat of alternating stresses that subject it to fatigue loading in accordance with high-frequency cycles.

In the document FR-A1-2 993 311, is described a device that allows the oil present in the cavity formed at the connection between two shafts to be expelled, by placing orifices in a region of the internal wall furthest from the axis. However, because of its shape, the trough 11 can trap oil which cannot be driven towards the expulsion orifices by centrifuging. In addition, it is not possible to consider placing expulsion orifices in the trough 11 because it is in line with the connection splines 9.

There is therefore a need to detect the presence of oil in the event of an insufficiency in the impermeability of the cavity corresponding to the trough made on such a power transmission shaft, between two shafts. The aim of the present invention is to meet this need.

DESCRIPTION OF THE INVENTION

For this purpose, the invention relates to a tubular turbine engine shaft, having at its inner periphery a trough, characterised in that said trough has at least one recess made in a surface centred on the axis of rotation of the shaft.

Trough is here understood to mean a hollow formed over the whole of the circumference of the rotary shaft in a substantially cylindrical portion of the inner periphery of the tubular shaft.

In this way, when said shaft is made to rotate in a turbine engine, if some oil enters at the trough, it begins by accumulating through a centrifugal effect in the recess or recesses, which form the part radially furthest from the wall of the trough. The oil trapped in these recesses then rotates at the same speed as the shaft and the unbalance that it creates becomes detectable.

Furthermore, generally, this type of trough is generally situated near an end piece of the shaft, which amplifies the size of the unbalance and facilitates its detection. In addition, in this instance, the production of a turbine engine shaft according to the invention means modifying its inner wall close to the end piece. This can be done before the assembly with an inner tubular part, which stops up the trough, without modifying either this part or the interfaces with this part. It is therefore a relatively simple and easily-performed modification to the design of a turbine engine shaft.

Preferably, said trough has a part in which said at least one recess is made on a surface generated by the rotation about the axis of rotation of a curve defined in a meridian plane.

This is therefore a trough where the oil would be distributed without any predetermination because of the symmetry of revolution of the geometry in the absence of recesses.

Advantageously, the turbine engine shaft comprises at least two recesses distributed on a circumference about the axis of rotation.

Preferably, the recesses are distributed regularly about said axis of rotation.

Even more preferably, the recesses are symmetrical in relation to said axis of rotation or in relation to a plane passing through said axis of rotation.

The number of recesses makes it possible to modify the frequency and the intensity of the unbalance created by the presence of a quantity of oil in the cavity. Generally, the geometry and the number of recesses define the volume of oil that will be retained. These parameters are adjusted in accordance with the desired unbalance value to be detected.

Advantageously, the recess or recesses are obtained by milling or by electrical discharge machining in an internal wall of the shaft.

According to another embodiment, the recess or recesses are formed by parts forming partitions and extending substantially radially from an internal wall of the shaft. The parts forming partitions can be fixed to an internal wall of the shaft by brazing or welding.

Advantageously, the tubular shaft of the turbine engine has connection means disposed at its outer periphery and configured so as to transmit a torque to another shaft.

Preferably, the trough is situated substantially in line with said connection means.

When said shaft is used in a turbine engine to transmit a torque, for example that of the power turbine, to another shaft, the invention makes it possible to detect any accumulation, in the trough made for mechanical reasons, of oil passing through the shaft opening at the connection between the shafts.

Said connection means can be splines.

The invention also relates to an assembly having such a turbine engine shaft and means closing said trough in a sealed manner so as to form a cavity of revolution. The closure means can comprise a hollow tubular part, cylindrical at the trough.

The invention also relates to a turbine engine comprising a shaft or an assembly, such as have just been described. In particular, it can correspond to the situation where the shaft is driven by the low-pressure turbine, and drives the shaft of the low-pressure compressor.

The invention also relates to a method for detecting the presence of oil inside a turbine engine shaft, at a trough in its inner periphery, characterised in that the method uses a shaft as described above, and in that the method comprises a step of measuring a value of an unbalance of the shaft synchronous with a rotation speed of the shaft, and a step of issuing an alert when the difference between said unbalance value and an unbalance value of the shaft alone is above a predetermined threshold, corresponding to the likely presence of oil trapped in one recess at least and producing an unbalance synchronous with the speed of the shaft.

BRIEF DESCRIPTION OF THE FIGURES

The present invention will be better understood, and other details, features and advantages of the present invention will become more clearly apparent on reading the description that follows of a non-restrictive example, with reference to the accompanying drawings wherein.

DESCRIPTION OF AN EMBODIMENT

Figure 1:
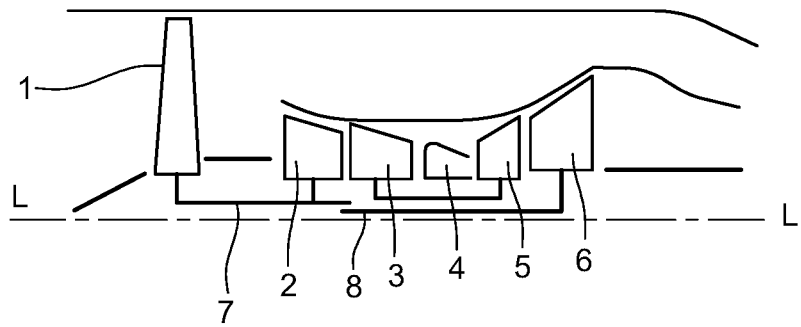
FIG. 1 is a diagrammatic representation of the architecture of a turbine engine according to the prior art.
Figure 2:
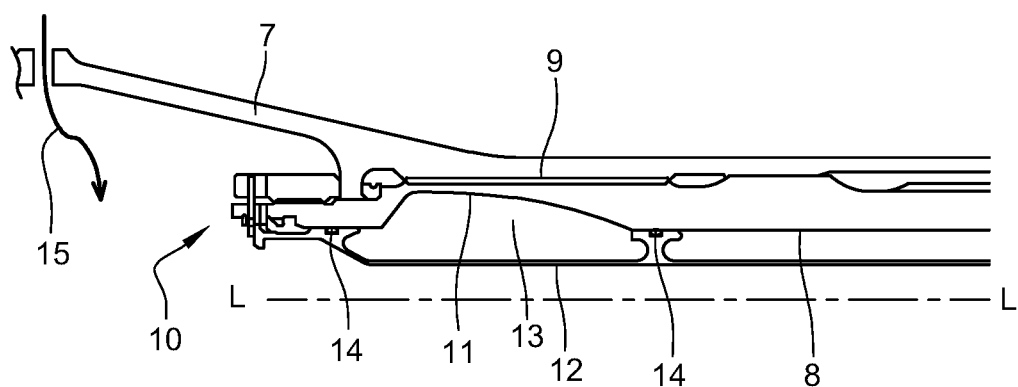
FIG. 2 shows a half-section along a meridian plane of an end of a shaft according to the prior art.
Figure 3:
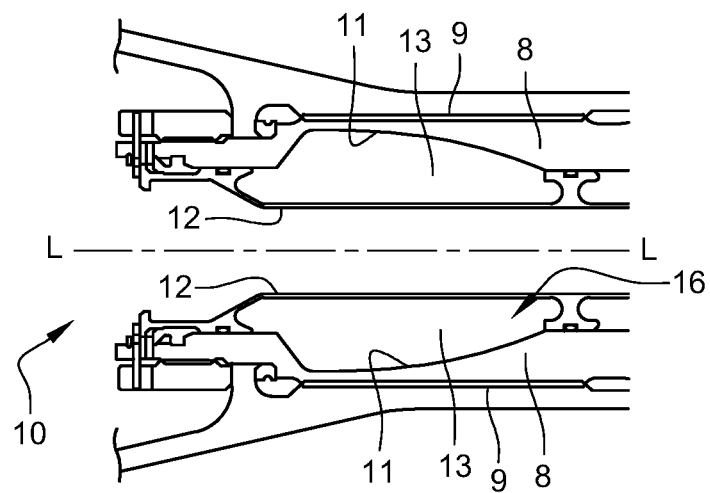
FIG. 3 shows a cross-section along a meridian plane of an end of a shaft according to the prior art with a pocket of oil.
Figure 4:
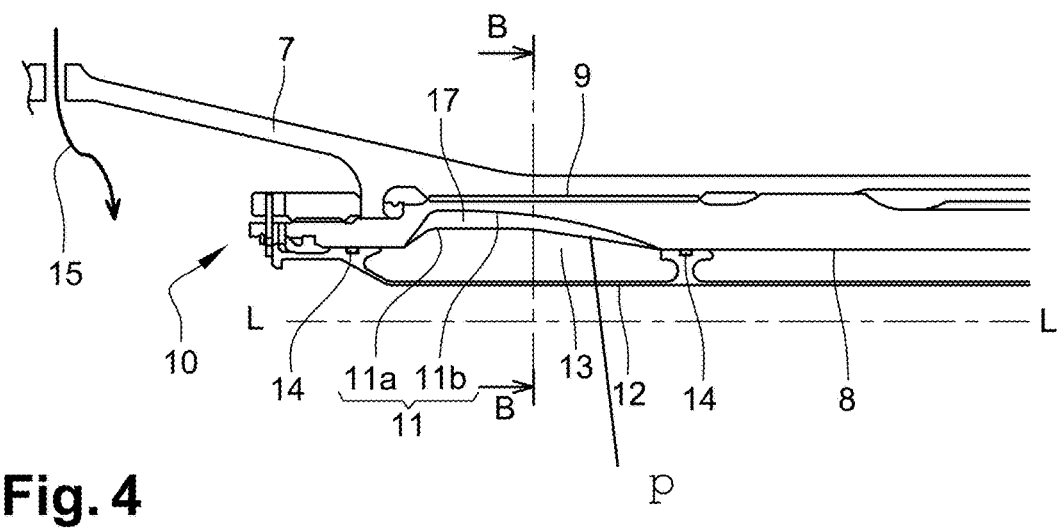
FIG. 4 shows a half-section along a meridian plane of an end of a shaft according to the invention.

With reference to FIG. 4, a turbine engine shaft made according to the invention differs from that shown in FIG. 2 in that the shape of the inner surface of the tubular shaft 8 has been modified at the trough 11.

The surface of the trough 11 has a part P which is a bottom surface of trough 11 closer to the axis of revolution LL than other parts of the bottom surface, generated by the rotation of a curve 11a in a meridian plane and which gives a first trough shape at the splines 9. However, it has at least one recess 17 obtained in an angular sector given by the junction between this first surface and a line 11b along, in a meridian plane, the maximum radius points on the surface of the recess 17. As shown in FIG. 4, recess 17 has the bottom surface P that is linked to trough 11.

Figure 5:
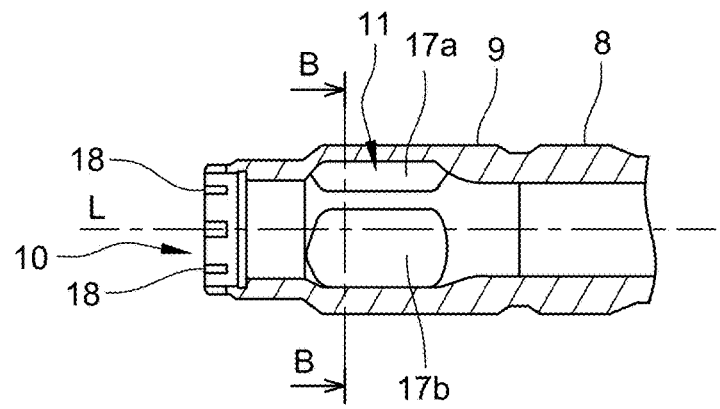
FIG. 5 shows a shaft according to the invention cut in two along a meridian plane, the inner tubular part having been withdrawn.

FIG. 5 shows two recesses 17a, 17b formed in this way in the trough 11 on the inner surface of the shaft 8.

The surface of a recess may or may not follow the line 11b of maximum radii over a certain angular displacement about the axis LL and can be connected in various ways to the surface along the generatrix 11a. The number of recesses can also vary. This depends to a certain extent on the technique used to create these recesses.

According to a first embodiment, the recesses 17a, 17b can be created by making hollows in the internal wall of the shaft 8.

Figure 6A:
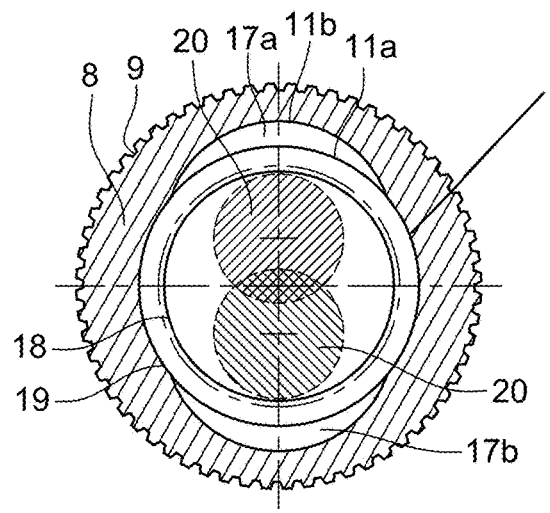
FIGS. 6a and 6b show a section along a plane BB defined in FIG. 5 of different variants of a shaft according to the invention for a first embodiment obtained with a first machining method.
Figure 6B:
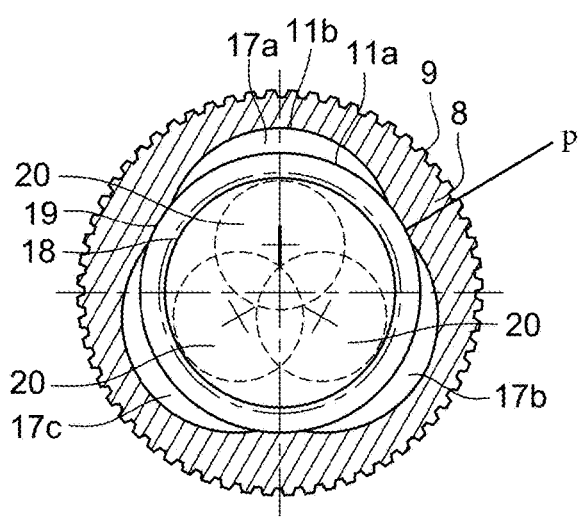

With reference to FIGS. 6a and 6b, the hollows can be obtained by milling in the wall of the shaft 8.

FIG. 6a shows a transverse section of the shaft 8, along a plane BB shown in FIGS. 4 and 5, in which two recesses 17a, 17b have been milled. The splines 9 on the radially outer section of the shaft 8 can be seen. The smaller circle represents the inner section 18 of the shaft 8 between the end 10 and the trough 11. It is through this section that the tools to hollow out the internal wall of the shaft 8 at the trough 11 can be passed.

A second circle 19 delimits the section of the internal wall in the trough 11 corresponding to the curve 11a, apart from the recesses 17a, 17b. Two recesses 17a and 17b are shown in FIG. 6a. Here, they are symmetrical in relation to a horizontal plane, in the drawing. The radius of their section decreases regularly between the central part, of maximum radius and corresponding to the position of the line 11b in FIG. 4 in the plane of section, and the ends meeting the minimum section 19 in the trough 11. They are symmetrical in relation to a vertical meridian plane. The trough 11 with its recesses 17a, 17b therefore has 2-fold symmetry here.

Different positions of the section 20 of the milling tool, during its introduction into the trough 11 through the end 10 of the shaft 8, are shown in FIG. 6a. It can be seen that the milling tool is introduced opposite the centre of each recess 17a, 17b before being moved in such a way as to remove the material and create the corresponding hollow. This procedure makes it possible to produce the same shapes for the various recesses by repeating the same sequence of instructions for the tool on each occasion.

FIG. 6b shows a variant in which three recesses 17a, 17b, 17c are created by milling in the wall of the trough 11 that has an originally circular section 19 corresponding to the curve 11a. Likewise, the milling tool 20 is introduced in front of the centre of each recess 17a, 17b, 17c at the beginning of the milling of each one. Here, the three recesses are identical and regularly spaced; the trough therefore has a 3-fold symmetry.

According to another machining method, with reference to FIGS. 7a to 7d, the hollows corresponding to the recesses are created by electrical discharge machining in the internal wall 19, corresponding to the curve 11a in FIG. 4, of the shaft 8 at the trough 11.

Figure 7A:
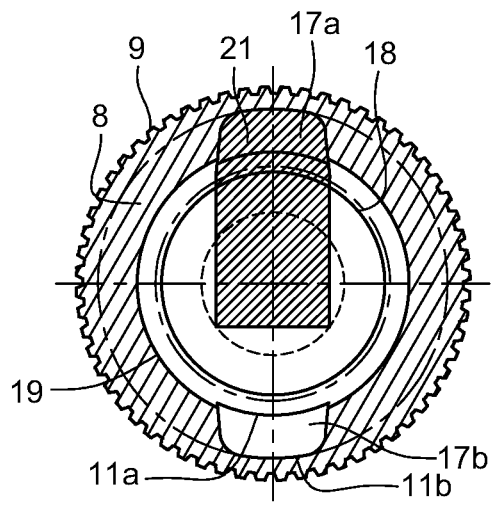
FIGS. 7a to 7d show a section along a plane BB defined in FIG. 5 of different variants of a shaft according to the invention for a first embodiment obtained with a second machining method.

FIG. 7a shows a transverse section of the shaft 8 in which two symmetrical recesses 17a, 17b are obtained by this method. Here, the electrode 21 of the tool can be seen in its final position when the upper recess 17a has been created. As before, the electrode 21 has been introduced inside the shaft 8 at the trough 11, through the end 10 of minimum transverse section 18. Here, the electrode 21 has been introduced through the centre and then translated towards the bottom of the recess 17a following the path shown by the hatched area during the electrical discharge machining process. On the opposite recess 17b it can be seen that said recess, in cross-section, has the shape of the mark made by the electrode 21.

Figure 7B:
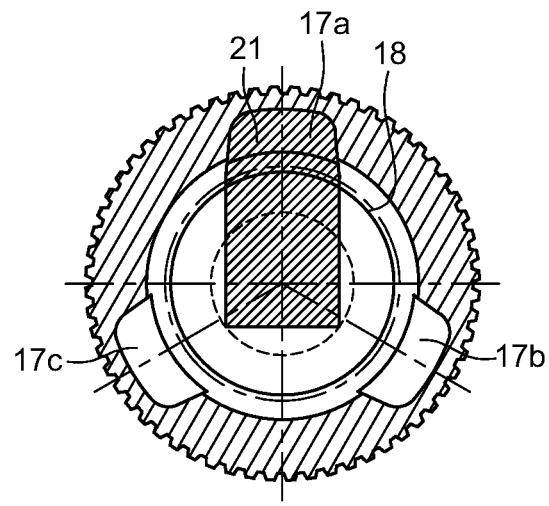
Figure 7C:
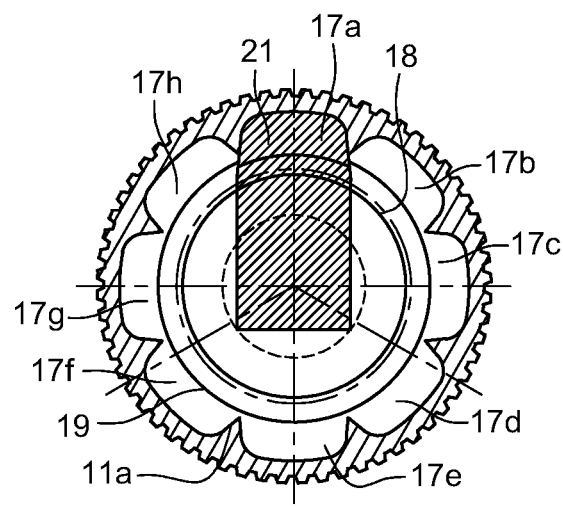
Figure 7D:
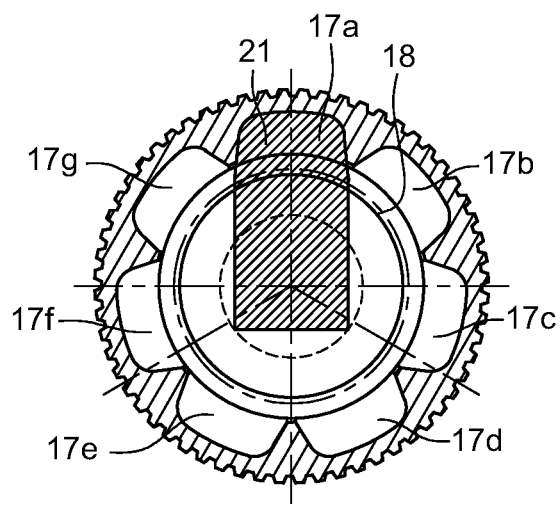

FIGS. 7b, 7c and 7d show variants where the electrode 21 has been used in three, eight or seven directions in order to create the same number of similar, regularly spaced recesses.

FIG. 7c, with eight recesses, illustrates an instance where, given the width of the electrode 21 and the number of recesses 17a-17h, the edges of the recesses meet. The radius of the minimum section 11a of the trough 11 with the recesses 17a-17h is therefore greater than that of the section 19 of the initial trough 11.

In fact, in another variant, not described in detail here but available to the person skilled in the art, the two machining methods presented can be used to directly create the trough 11 with its recesses 17a-17h in accordance with a desired shape, inside a shaft 8 the internal wall of which may be cylindrical, without a trough shape made beforehand.

According to a second embodiment, the recesses can be obtained by filling the space inside a trough 11 initially made in the shaft 8.

Figure 8A:
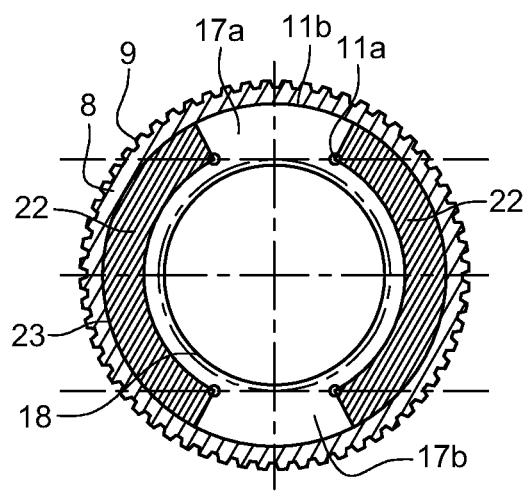
FIGS. 8a and 8b show a section along a plane BB defined in FIG. 5 of different variants of a shaft according to the invention for a third embodiment.

With reference to FIG. 8a, two identical parts 22, having a transverse section corresponding to an annular sector of less than 180°, are installed symmetrically on the right and the left of the internal wall 23 of the initial trough 11, here corresponding to the position of the line 11b at the transverse cross-section BB. Two recesses 17a, 17b, themselves corresponding to angular sectors having the same depth as the parts 22, are thus formed above and below. The assembly has a 2-fold symmetry.

Figure 8B:
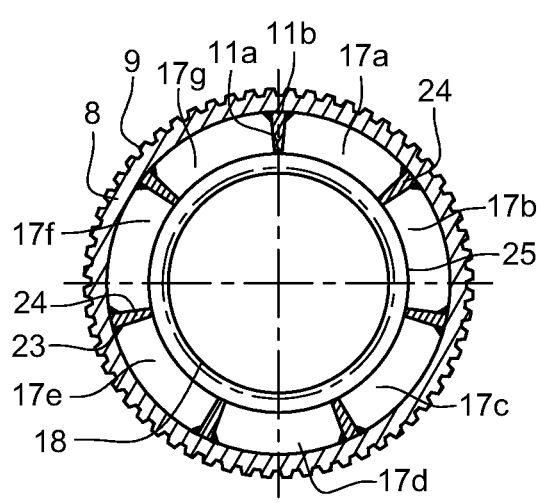

In a variant, it is rather a series of relatively thin partitions 24, which are installed radially on the internal wall 23 of the initial trough 11. As these partitions 24 are regularly spaced, they form a series of symmetrical recesses 17a-17g, the symmetry being seven-fold in FIG. 8b. The radially inner end of these partitions 24 follows the evolution of the curve 11a of minimum radius shown in FIG. 4. These partitions 24 can be connected to one another by one or more than one internal collar 25 in order to provide their mechanical strength.

These parts 22 or partitions 24 can be fixed by brazing or welding to the inner surface 23 of the shaft 8, in the trough 11.

As can be seen from the examples that have just been presented, it is possible to make the shaft 8 without having to modify other parts, in particular the internal tubular part 12 designed in accordance with the prior art. The complete assembly of the shaft can be effected afterwards, in accordance with the prior art, by fitting the internal tubular part 12 in the shaft 8, equipped with recesses 17 in the trough 11.

The invention has been presented using preferably at least two recesses in order to maintain the symmetry of the shaft when there is no oil but it is also possible to envisage making only a single recess there, which will then necessarily trap the oil in a non-symmetrical manner.

Furthermore, the production of the recesses has been presented here in a trough made in the area of the connecting means of the shaft because this trough is close to the passage of the oil at the connection end piece of the shaft and therefore corresponds to an identified risk. However, it is evident that the invention can be applied to any shaft having a trough in any place on its inner periphery and where it is feared that oil will accumulate and create unwanted forces as it rotates. In particular, the methods for creating recesses by milling or electrical discharge machining described above can be used, bringing the tools to the trough through one of the open ends of the tubular shaft, as has been described above.

Lastly, where a shaft such as that just described has been fitted in a turbine engine, it is possible to equip the turbine engine with vibration sensors in accordance with known technologies. If a ring seal 14 of the cavity 13 deteriorates and if oil accumulates in the cavity 13, by virtue of the invention the oil is trapped in at least one of the recesses 17 and the unbalance becomes synchronous with the speed of the shaft. A system for monitoring a turbine engine equipped with a computer that has appropriate software can then measure the value of the shaft unbalance and compare it with a reference unbalance value, measured beforehand for the shaft alone, without oil. If this value differs from the reference value beyond a predetermined threshold, the system can then issue an alert indicating the appearance of vibrations due, probably, to the presence of oil in the recesses 17 of the trough 11 and therefore of an oil unbalance.

The invention claimed is:

1. A tubular turbine engine shaft, having at its inner periphery a trough, wherein said trough has at least one recess which is made in a surface centered on the axis of rotation of the tubular engine shaft and is for trapping oil entering in said trough.

2. The turbine engine shaft according to claim 1, wherein said trough has a part in which said at least one recess is made on a surface generated by the rotation about the axis of rotation of a curve defined in a meridian plane.

3. The turbine engine shaft according to claim 1, comprising at least two recesses distributed on a circumference about the axis of rotation of the tubular engine shaft.

4. The turbine engine shaft according to claim 3, wherein the recesses are distributed regularly about said axis of rotation.

5. The turbine engine shaft according to claim 4, wherein the recesses are symmetrical in relation to said axis of rotation or in relation to a plane passing through said axis of rotation.

6. The turbine engine shaft according to claim 1, wherein the recess or recesses are obtained by milling or by electrical discharge machining in an internal wall of the tubular engine shaft.

7. The turbine engine shaft according to claim 1, wherein the recess or recesses are formed by parts forming partitions and extending substantially radially from an internal wall of the shaft.

8. The turbine engine shaft according to claim 7, wherein the parts forming partitions are fixed by brazing or welding.

9. The tubular turbine engine shaft according to claim 1, having connection means disposed at its outer periphery and configured so as to transmit a torque to another shaft.

10. The tubular turbine engine shaft according to claim 9, wherein the trough is situated substantially in line with said connection means.

11. The turbine engine shaft according to claim 9, wherein the connection means are splines.

12. The turbine engine shaft according to claim 1 wherein the trough forms a hollow inside the inner periphery.

13. The turbine engine shaft according to claim 1 wherein the trough has a surface having a part closer to the axis of rotation generated by the rotation of a curve in a meridian plane.

14. The turbine engines shaft according to claim 1 wherein the at least one recess comprises a bottom surface linked to a surface of the trough.

15. The turbine engines shaft according to claim 1 wherein the recess has a closed surface which is linked to a surface of the trough.

16. A method for detecting the presence of oil inside a tubular turbine engine shaft according to claim 1, at the trough in the inner periphery of the tubular turbine engine shaft, the method comprising:
   a step of measuring a value of an unbalance of the tubular turbine engine shaft synchronous with a rotation speed of the tubular turbine engine shaft, and
   a step of issuing an alert when the difference between said unbalance value and an unbalance value of the tubular turbine engine shaft alone is above a predetermined threshold, said predetermined threshold corresponding to the likely presence of oil trapped in one recess at least and producing an unbalance synchronous with the speed of the tubular turbine engine shaft.

* * * * *